United States Patent
Accapadi et al.

(10) Patent No.: US 9,354,934 B2
(45) Date of Patent: May 31, 2016

(54) PARTITIONED SHARED PROCESSOR INTERRUPT-INTENSIVE TASK SEGREGATOR

(75) Inventors: Mathew Accapadi, Austin, TX (US); Grover Cleveland Davidson, II, Austin, TX (US); Dirk Michel, Austin, TX (US); Bret Ronald Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 912 days.

(21) Appl. No.: 13/343,920

(22) Filed: Jan. 5, 2012

(65) Prior Publication Data

US 2013/0179616 A1 Jul. 11, 2013

(51) Int. Cl.
G06F 9/46 (2006.01)
G06F 9/50 (2006.01)
G06F 11/20 (2006.01)
G06F 9/48 (2006.01)

(52) U.S. Cl.
CPC ............ *G06F 9/5033* (2013.01); *G06F 9/4812* (2013.01); *G06F 9/5061* (2013.01); *G06F 9/5077* (2013.01); *G06F 11/2092* (2013.01); *G06F 2212/152* (2013.01)

(58) Field of Classification Search
CPC ....... G06F 9/50; G06F 9/5027; G06F 9/5061; G06F 9/5077; G06F 9/5088
See application file for complete search history.

(56) References Cited

U.S. PATENT DOCUMENTS

| | | | |
|---|---|---|---|
| 2008/0178183 A1* | 7/2008 | Accapadi et al. | 718/102 |
| 2009/0198850 A1* | 8/2009 | Suzuki | 710/267 |
| 2010/0064168 A1* | 3/2010 | Smoot et al. | 714/6 |
| 2010/0186019 A1* | 7/2010 | Branson et al. | 718/104 |
| 2010/0274939 A1* | 10/2010 | Egger et al. | 710/266 |
| 2010/0299472 A1 | 11/2010 | Tanaka et al. | |
| 2011/0035752 A1* | 2/2011 | Krishnakumar et al. | 718/103 |
| 2011/0093638 A1* | 4/2011 | Divirgilio et al. | 710/267 |

OTHER PUBLICATIONS

IBM; "Aix Virtual Processor Folding is Misunderstood"; retrieved on Oct. 11, 2011 from ibm.com/developerworks/mydeveloperworks/blogs/aixpert/e?lang=en.
IBM; "Optimize Performance for Green Computing"; retrieved on Oct. 11, 2011 from ibmsystemsmag.com/CMSTemplates/IBMSystemsMag/Print.a.
Lilja, David J.; "Measuring Computer Performance: A Practitioner's Guide", Cambridge University Press, 2000, pp. 17, 18, 221, and 222.

* cited by examiner

*Primary Examiner* — Abdullah Al Kawsar
*Assistant Examiner* — Caroline H Arcos
(74) *Attorney, Agent, or Firm* — Robert H. Frantz; Grant A. Johnson (57) ABSTRACT

Interrupt-intensive and interrupt-driven processes are managed among a plurality of virtual processors, wherein each virtual processor is associated with a physical processor, wherein each physical processor may be associated with a plurality of virtual processors, and wherein each virtual processor is tasked to execute one or more of the processes, by determining which of a plurality of the processes executing among a plurality of virtual processors are being or have been driven by at least a minimum count of interrupts over a period of operational time; selecting a subset of the plurality of virtual processors to form a sequestration pool; migrating the interrupt-intensive processes on to the sequestration pool of virtual processors; and commanding by a computer a bias in delivery or routing of the interrupts to the sequestration pool of virtual processors.

18 Claims, 8 Drawing Sheets

Fig. 3a - Typical Distributed Interrupt-driven Processes on Multiple Virtual Cores Fig. 3b - Sequestered Interrupt-driven Processes on Targeted Virtual Core(s)

Fig. 4

PARTITIONED SHARED PROCESSOR INTERRUPT-INTENSIVE TASK SEGREGATOR

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

The present invention to methods for organizing and managing multiple simultaneous processes, tasks and threads on multiple processor core computer systems.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

As is known in the art, multithreading is often accomplished with operating system functionality which time shares the processor(s) among the multiple threads. And, multiprocessors or multi-core processors can be employed to execute a single process divided amongst the multiple CPUs, or employed to execute multiple threads or processes divides amongst the multiple CPUs.

SUMMARY OF THE INVENTION

Embodiments of the invention include, but are not limited to, fabricated circuits, design structures for such circuits, and processes as described herein. Interrupt-intensive and interrupt-driven processes are managed among a plurality of virtual processors, wherein each virtual processor is associated with a physical processor, wherein each physical processor may be associated with a plurality of virtual processors, and wherein each virtual processor is tasked to execute one or more of the processes, by determining which of a plurality of the processes executing among a plurality of virtual processors are being or have been driven by at least a minimum count of interrupts over a period of operational time; selecting a subset of the plurality of virtual processors to form a sequestration pool; migrating the interrupt-intensive processes on to the sequestration pool of virtual processors; and commanding by a computer a bias in delivery or routing of the interrupts to the sequestration pool of virtual processors.

BRIEF DESCRIPTION OF THE DRAWINGS

The following detailed description when taken in conjunction with the figures presented herein provide a complete disclosure of the invention.

DETAILED DESCRIPTION OF THE INVENTION

The following detailed descriptions of exemplary embodiments according to the present invention are provided to illustrate the manner of making and using our invention, but are not intended to represent the scope of the invention. Rather, the claims should be utilized to establish the scope of the present invention. For example, many of the embodiment descriptions provided herein will refer to implementation with a POWERS-based computer (POWER5™), which is an International Business Machines Corporation (IBM)™ quad-core multiprocessor. The invention, however, is not limited to use with a POWER5™ multiprocessor, but may be applied beneficially to other multiprocessors as well.

POWER5 Architecture

Figure 4:
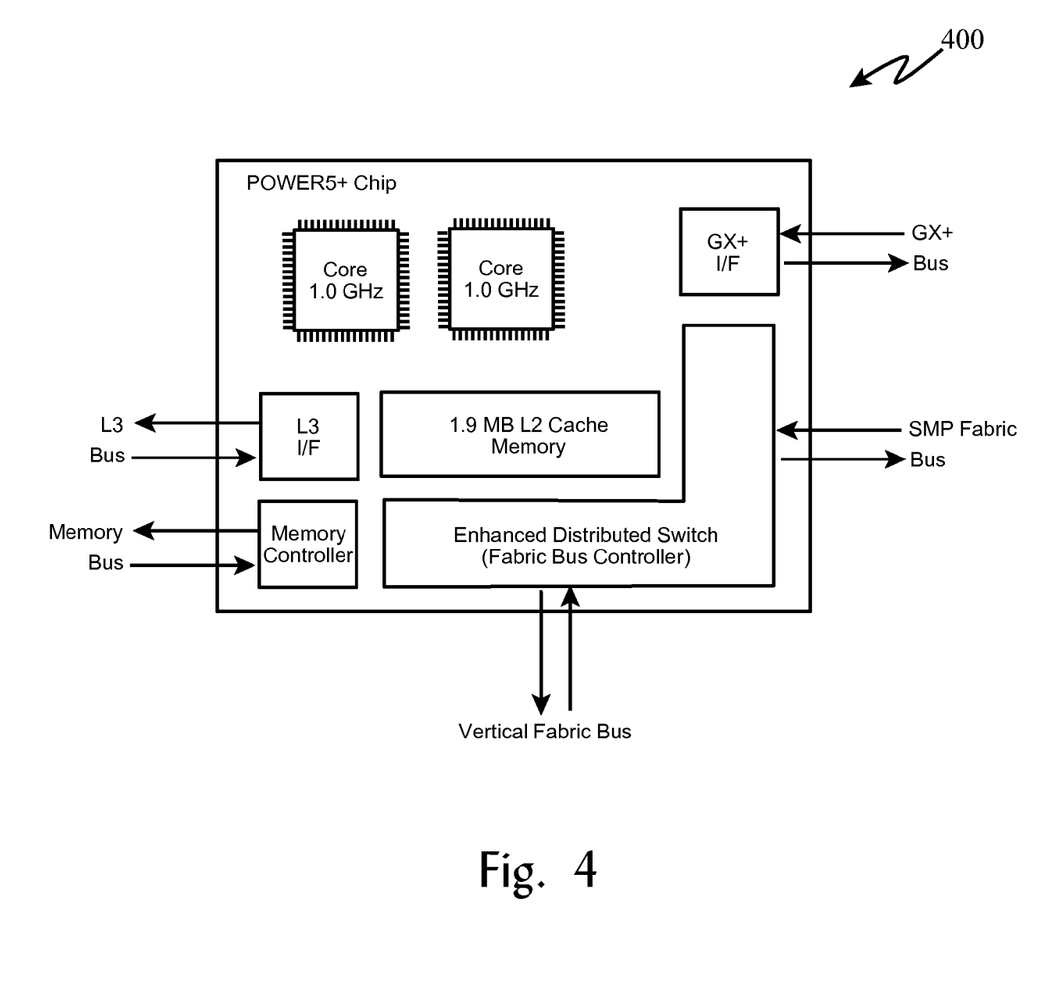
FIG. 4 provides a high level view of an IBM POWER5+™ multi-core processor.

For the convenience of the reader, a brief overview of a POWER5+™ processor chip is shown in FIG. 4. According to the IBM™ publication "IBM System P5 Quad-Core Module Based on POWER5+Technology: Technical Overview and Introduction" Redbooks paper by Scott Vetter, et al., copyright 2006:

"The POWER5+chip features single-threaded and multi-threaded execution for higher performance. A single die contains two identical processor cores, each of which uses simultaneous multithreading to supporting two logical threads. This architecture makes a single dual-core POWER5+chip appear to be a four-way symmetric multiprocessor to the operating system. The POWER5+ processor supports the 64-bit PowerPC® architecture.

The POWER5+chip has a 1.9 MB on-chip L2 cache that is implemented as three identical slices with separate controllers for each. Either processor core can independently access each L2 controller. The L3 cache, with a capacity of 36 MB, operates as a back door with separate buses for reads and writes that operate at half processor speed."

Not shown in this high level (and highly simplified) block diagram is the on-chip L3 cache directory and the cache controller, all of which are implemented in hardware circuitry on the chip. Embodiments of the present invention may be realized in conjunction with other multi-core and multi-processor architectures, and need not be limited to the example embodiments provided herein using the POWER5+device.

Definitions

"Multiprocessing", "multicore" processing, and "multi-threading" are terms which are used commonly within the art of computing. However, their context often dictates their exact meaning in many instances. For our purposes of this disclosure, we will use the following definitions:

"ALU"—Arithmetic Logical Unit.

"CPU"—Central Processing Unit.

"core"—a CPU, ALU, or MAC electronic hardware circuit.

"hypervisor"—also referred to as a virtual machine monitor, allows "virtualization" of a computing platform, often a multi-procesor computing platform, such that multiple operating systems may execute applications concurrently on the same computing platform; and "IC"—Integrated Circuit.

"interrupt"—Usually an electronic hardware signal, but sometimes a software signal, which, when activated, causes a processor or core to execute one or more threads, processes or tasks assigned to handle the interrupt, often used for coordinating tightly-coupled software and hardware functions such as Direct Memory Access (DMA) operations.

"MAC"—Multiplier/Accumulator unit.

"process"—a single software program or function being performed by a computer;

"software thread"—a special type of process or part of a process which can be replicated so that multiple, independent copies of the process can be executed, often apparently simultaneously through time sharing or time division multiplexing of a single (or multiple) microprocessors;

"multithreading"—the act of executing multiple threads on a single microprocessor or among multiple microprocessors;

"multiprocessing"—using two or more CPU's, ALU's, or MAC's within a single computer system to accomplish one or more processes or threads;

"multi-core"—a type of multiprocessor in which the plurality of CPU's ALU's, and/or MAC's are contained within a single IC or on separate IC's which are packaged together in a single package;

"processing partition"—a portion of computing platform execution time and resources assigned to one of multiple operating systems by a hypervisor.

"virtual core"—an abstracted core created by an operating system, such as IBM's AIX™ or Linux, which represents the functionality of a CPU, ALU, or a MAC electronic hardware circuit, but may not actually consume an entire hardware CPU, ALU or MAC.

Discovery of a Problem

Operating systems such as IBM's AIX™ and Linux abstract the actual hardware details of one or more electronic circuit "cores" to "virtual cores". Hardware cores are sometimes referred to as "physical cores". When a process is running in a virtual core (e.g. during runtime), the process may actually be sharing processing time on a physical core with one or more other processes, but from a thread or task perspective, the process is unaware of the other processes sharing the physical core with it. Rather, the process is provided a virtual execution environment (memory, processing, interrupts, registers, etc.) which appears to be dedicated (e.g. not shared) to the process. The operating system which creates and manages the virtual cores enforces certain operational features which guarantee that processes running in virtual cores cannot access or corrupt memory of processes which are running in separate virtual cores, for example. One such operating system feature is IBM's PowerVM™, on which four virtual cores often are managed for a single physical core, or even up to ten virtual cores. PowerVM™ and similar operating system features are well documented in the art.

Processor virtualization has become a common-place technology in servers today. While processor virtualization has many benefits, there are cases than it can cause significant quality of service or CPU consumption side-effects. One such case is that of workloads that have significant interrupt driven transactions. For example, consider a case of a single software thread that is receiving requests from a remote system via a high speed local area network (LAN) and responding immediately to each request. Because the virtual processor that the software thread resides upon becomes idle when waiting for new incoming requests, the natural tendency is to cede the physical processor to the hypervisor to give it the opportunity to run other work, thus the sequence might be observed in the tasking of the processor:

| > | | |
|---|---|---|
| \| | a. | interrupt is caught by hypervisor; |
| \| | b. | virtual processor is dispatched; |
| \| | c. | software thread receives request; |
| \| | d. | software thread responds to request; |
| \| | e. | virtual processor goes idle; |
| < | f. | virtual processor is ceded to the hypervisor. |

Because the "cost" (e.g. negative impact to performance) to transition in and out of one virtual processor and into another is potentially high (>1 microsecond) and the potential rate of interrupting is also high (10-15 microseconds and falling all the time), the overhead in latency and CPU can approach 20% in practice. When ordinary distribution of interrupt-driven tasks over multiple available cores is implemented, each of the virtual cores can suffer such an overhead latency, as the inventors have discovered and recognized.

Overview of the Solution Devised by the Inventors

Embodiments according to the invention take advantage of three characteristics of such multi-core computing platforms:

1. it is possible for the operating system to identify which threads are interrupt intensive;

2. the operating system has control as to when it cedes virtual processors to the hypervisor; and 3. the operating system can control the distribution of hardware interrupts to virtual processors.

In a first aspect of embodiments according to the present invention, an operating system running on more than one virtual processor is modified to selectively migrate interrupt intensive threads onto a subset of the virtual processors in the partition and bias interrupt delivery to those cores, thereby sequestering the interrupt-intensive threads into or onto the selected virtual processor(s) and relieving the remaining virtual processor(s) free to execute non-interrupt-intensive threads, tasks or processes. In the present context, "bias" is used to mean directing interrupts to a particular virtual processor or set of virtual processors, especially to virtual processor(s) which are not experiencing sleep/activate/sleep/cycles often.

It is important to note that this sequestering or segregating process is distinct from AIX processor folding, which reduces the number of virtual processors in use based on system load. Rather, methods according to the present invention may extend the processor folding functionality to include essentially three subsets (pools) of virtual processors within the partition:

1. Inactive virtual processors (folded).
2. Active virtual processors that are interrupt biased (unfolded) (these virtual processors DO NOT cede idle time to the hypervisor).
3. Actual virtual processors that are non-interrupt biased (these virtual processors DO cede idle time to the hypervisor).

The capacity of each of these pools may vary over time, based on load To implement this, the operating system must be able to "track" in time the times that a software thread is dispatched due to an interrupt. This is accomplished by having a counter per thread. When a thread is made runnable by an interrupt handler, this counter can be incremented. In AIX parlance, this would be a small extension to the "setrq" function. Periodically, the per-thread values would be decremented or reset to allow behavior where a thread is interrupt intensive but becomes non-interrupt intensive, or vice versa, over time.

Threads which are deemed to be interrupt-intensive are moved into the interrupted-biased group of virtual processors (e.g. the sequestration virtual processors). The determination of which threads are interrupt intensive is a decision that is based on the number of interrupts associated with it per unit of time in at least one embodiment. There is no particular single rule of thumb for a given computing environment of what should be considered interrupt-intensive, as such a determination will be implementation specific in order to realize the desired savings in overhead, such as reducing cache misses, reducing pipeline disruptions, reducing power cycling, etc. As such, the particular rules for designating processes as interrupt-intensive may vary considerably between systems and embodiments, and may even vary over time within a given system or embodiment as the workload changes on the processors and cores. Threads for which behavior changes over time may move back and forth between the two unfolded virtual processor sets. Interrupts are biased to be delivered to the virtual processors in the interrupt intensive set. Many microprocessors provide mechanisms that allow operating systems to deliver interrupts to a single processor or a subset of processors dynamically. The number of processors in each unfolded set may vary based on instantaneous usage, much as is done with processor folding today.

So, whereas in the current state of the art interrupts are handled in a round-robin distributed manner among multiple virtual cores which distributes the inefficiency of waking up cores, and whereas activating a core takes time to complete, methods and embodiments according to the present invention to dynamically sequester or segregate interrupt-intensive processes to a subset or pool of virtual processors may minimize this inefficiency by having one or more virtual cores active all or most of the time, such that interrupt servicing is also quicker and more efficient overall. In some embodiments, the selection of which virtual processor(s) onto which the interrupt-intensive processes will be sequestered may be random or arbitrary, while in other embodiments, the selection may be based upon criteria such as hardware advantages (e.g. a core's closeness or proximity to the interrupt controller or interrupt adapter), software advantages (e g running an operating system which is more adept at responding to interrupts), or combination of such criteria.

SPECIFIC EXAMPLES OF EMBODIMENTS AND OPERATION

Figure 2A:
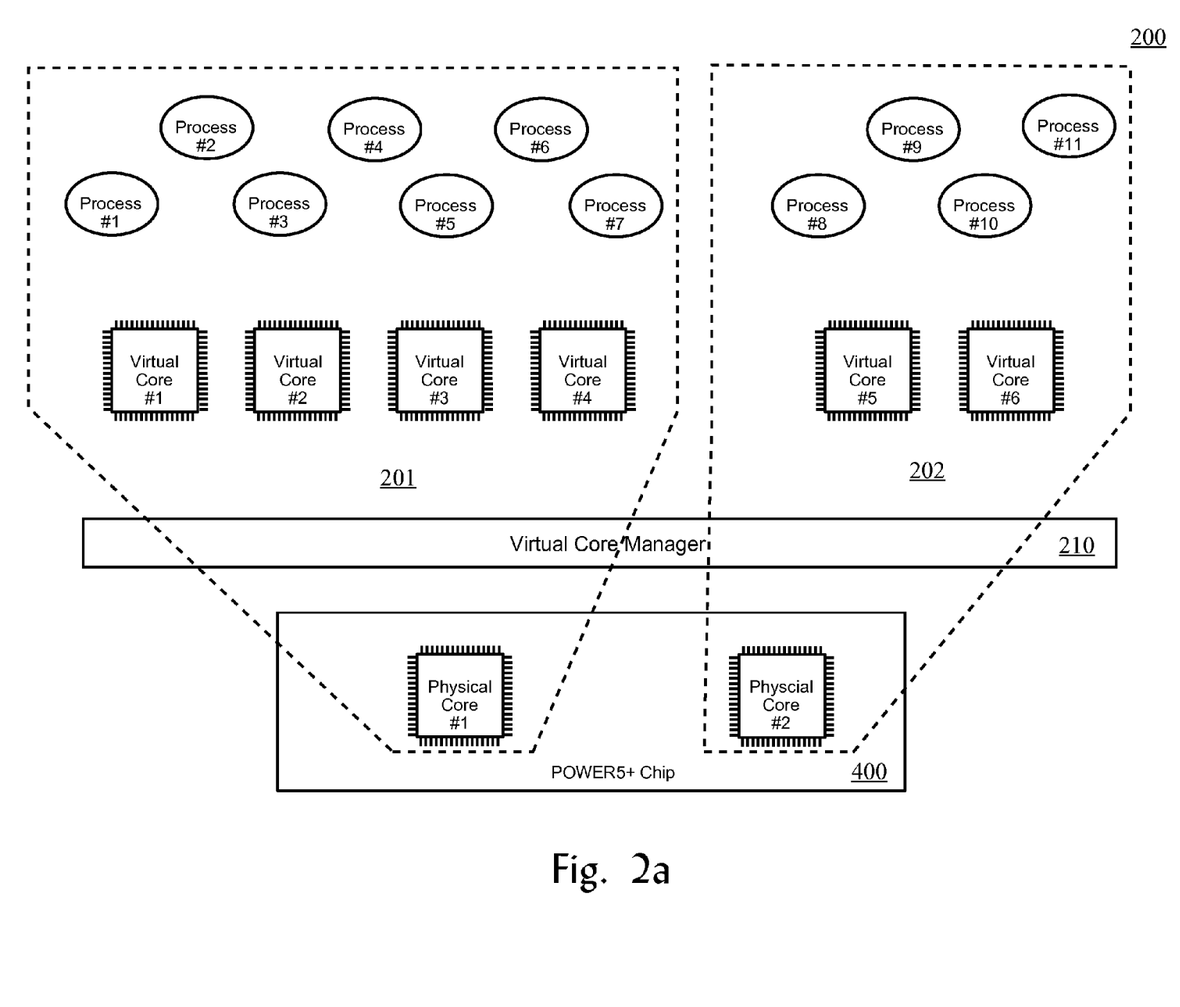
FIG. 2a shows an example association of six virtual cores to two physical cores.

Turning now to FIG. 2a, a processor (400) having two physical cores is shown, in which a virtual core manager (210) associates or creates four virtual cores (201) with the first physical core, and associates or creates two more virtual cores (202) with the second physical core. And, seven processes are associated or assigned for execution by the first pool of virtual cores (201), while four more processes are associated or assigned for execution by the second pool (202) of virtual cores. As can be seen by this diagram, processes 1 through 7 are actually physically executed by physical core 1, while processes 8 through 11 are physically executed by physical core 2.

Figure 2B:
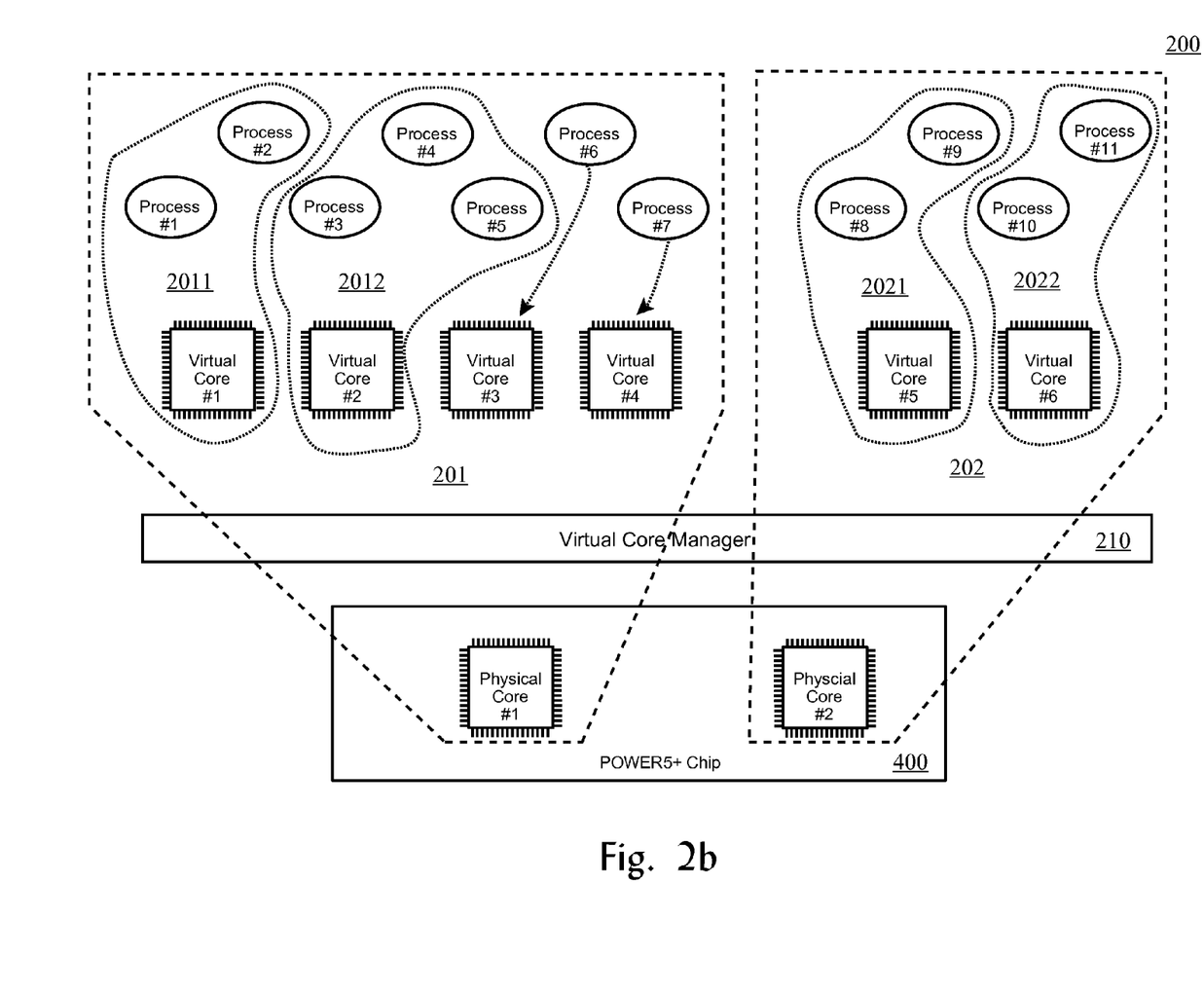
FIG. 2b extends the diagram of FIG. 2a by showing an example assignment of ten processes or tasks to the six virtual cores.

Now referring to FIG. 2b, an example of hypervisor assignment of the processes to specific virtual cores is shown, in which processes 1 and 2 are assigned (2011) to virtual core 1, processes 3 through 5 are assigned (2012) to virtual core 2, etc. (2021, 2022). Each of these virtual cores would then multitask or multithread execute the one or more processes assigned to them using the physical resources of the physical cores with which they are logically associated.

Figure 2C:
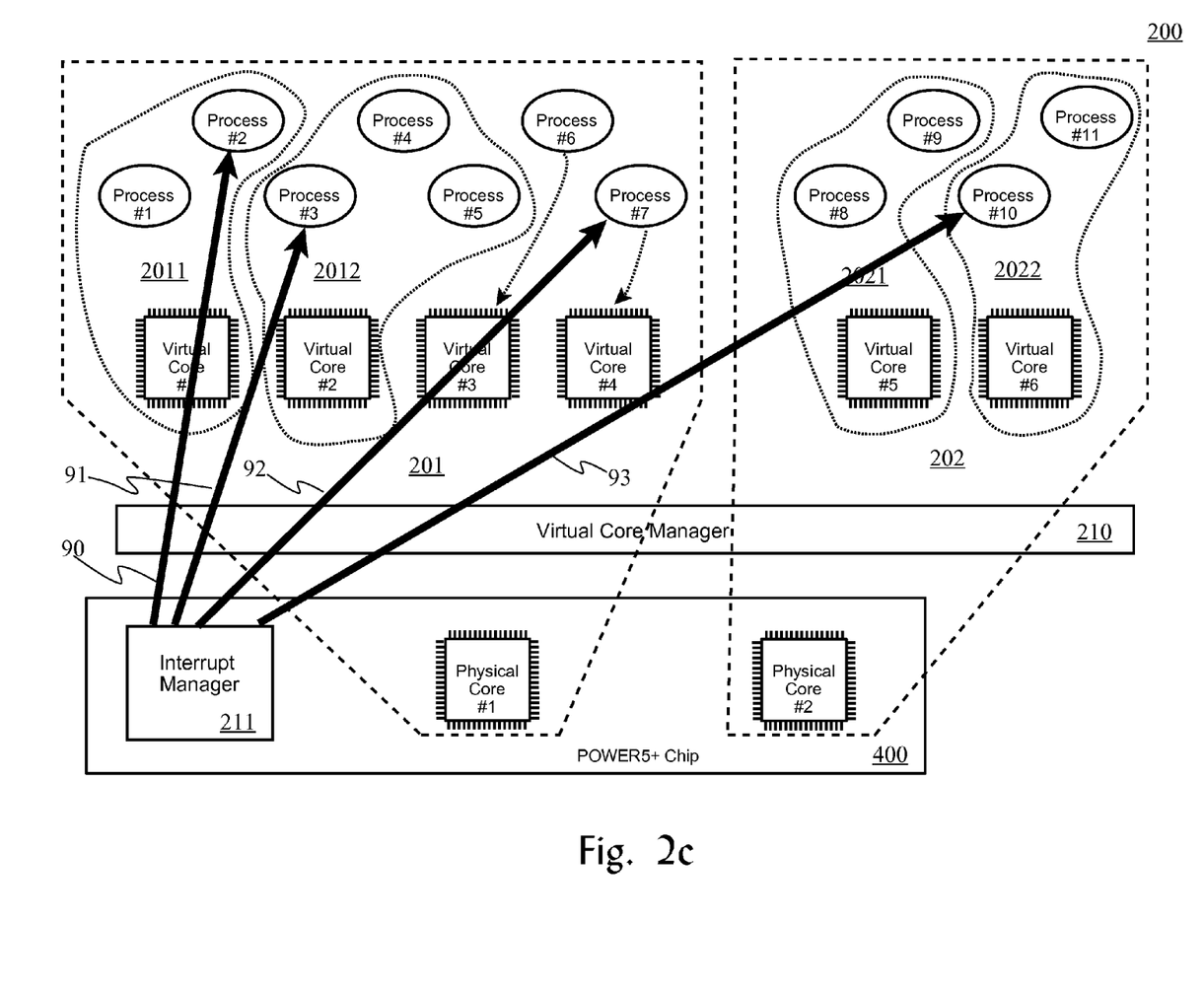
FIG. 2c extends the diagram of FIG. 2b to show distribution of interrupts from an interrupt manager to four of the processes running on the virtual cores.

Proceeding to FIG. 2c, four interrupts (90, 91, 92, 93) are shown being dispatched from an interrupt handler (211) portion of the processor (400) to processes 2, 3, 7 and 10, respectively, in a normal, distributed manner according to the methods of the present state of the art.

Figure 3A:
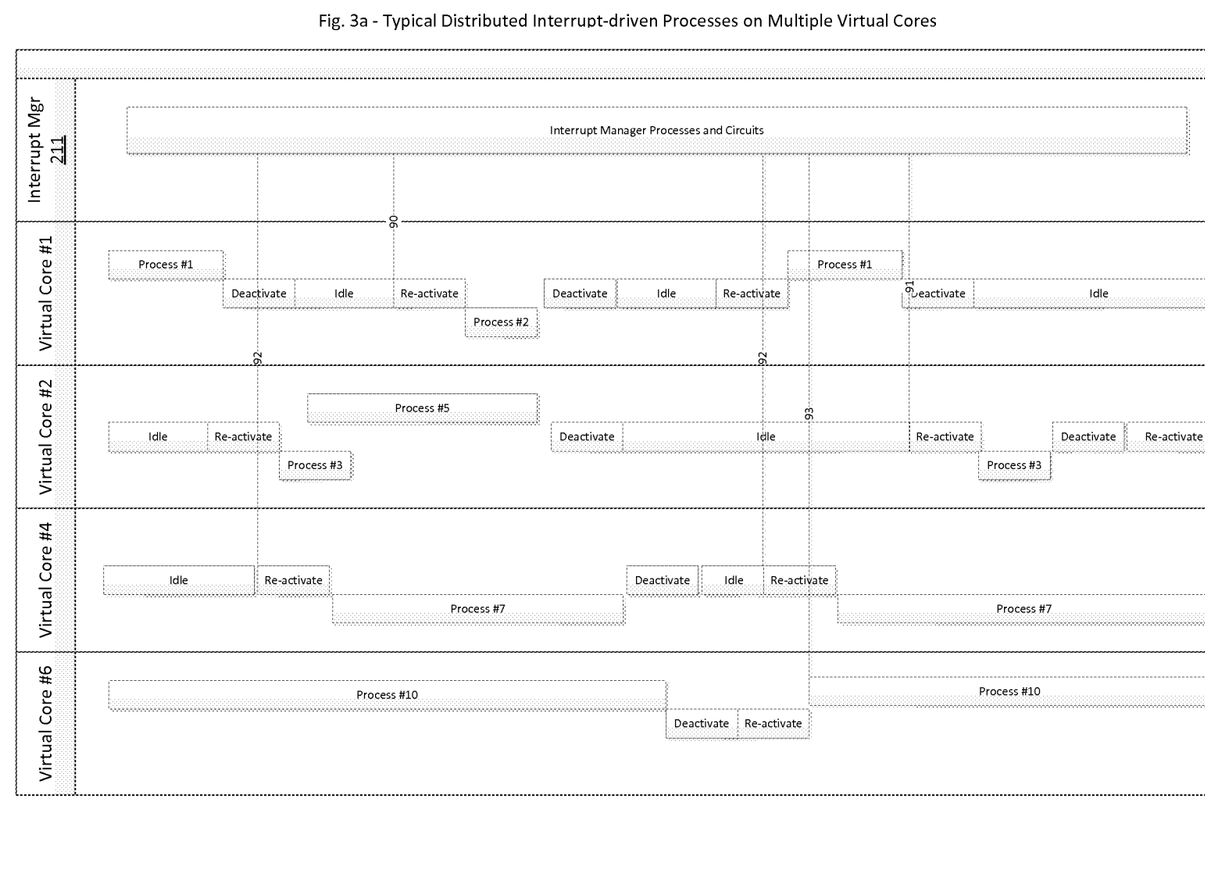
FIG. 3a illustrates an example multi-threaded or multi-tasking timeline of some of the example virtual cores of FIGS. 2a-2c.

Bearing in mind FIGS. 2a-2c, an example timeline which might be observed during operation of such a system is shown in FIG. 3a, in which time is progressing or advancing from left to right, and in which items aligned vertically are occurring essentially simultaneously or at least in a multi-tasking manner. In this typical, distributed arrangement, it is shown that on virtual core 1 when interrupt (90) associated with (handled by) process 2 is received, there is a delay required in order to re-activate virtual core 1 because it is currently idle. Similarly, when the interrupt (92) which is handled by process 7 is received, there is a delay to handling or responding to it because virtual core 4 is idle at that time as well. The same is illustrated for the receipt of interrupt (91, 93) handled by processes 3 and 10 in virtual cores 2 and 6, respectively. One can see from this illustration considerable amounts of inefficiency in the form of the reactivation time periods and the delays or latency to responding to each interrupt.

Figure 1A:
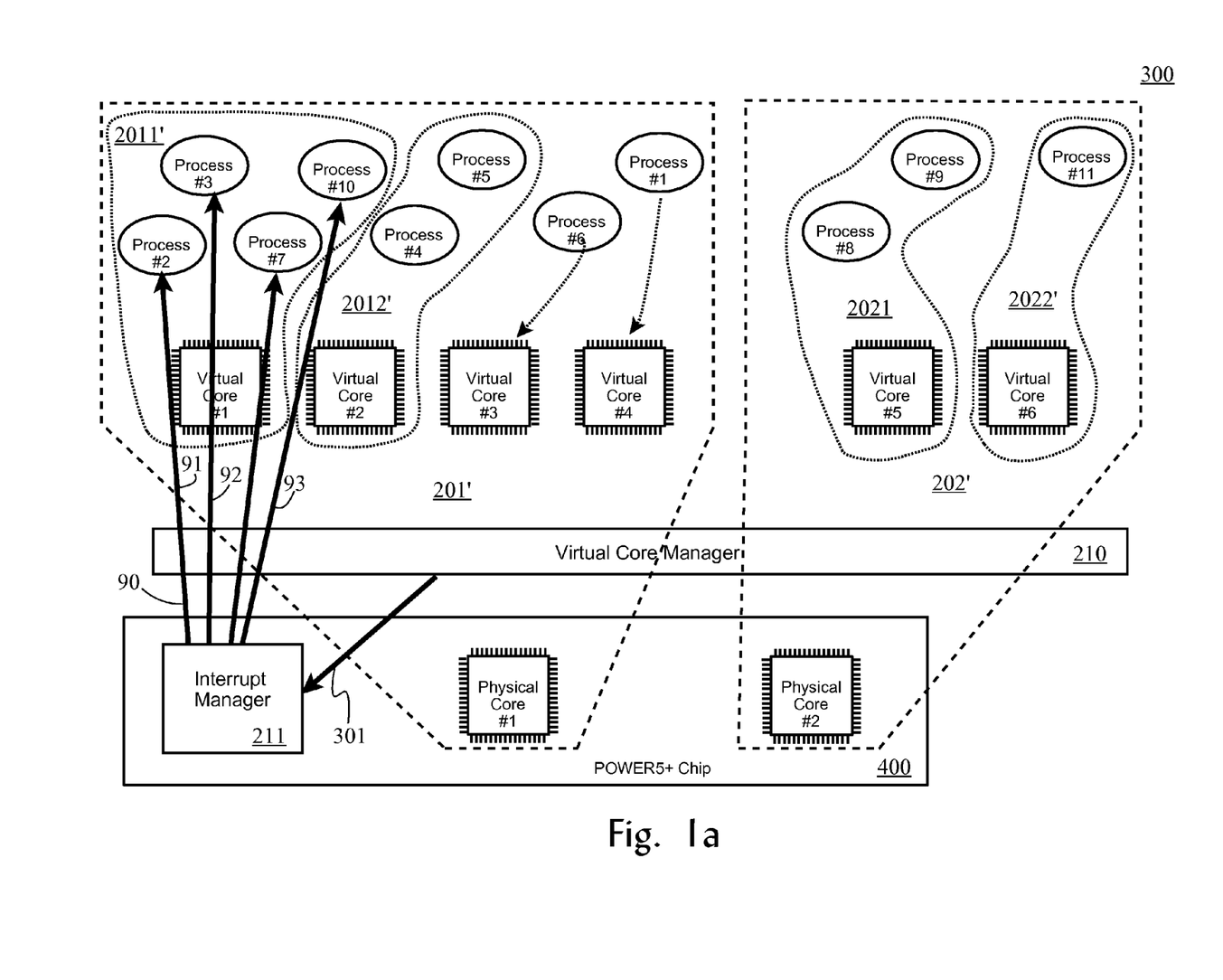
FIGS. 1a and 1b depict an examples of interrupt-intensive processes (tasks) sequestered onto a selected core (or selected scores) of multiple available cores according to at least one embodiment of the present invention.
Figure 1B:
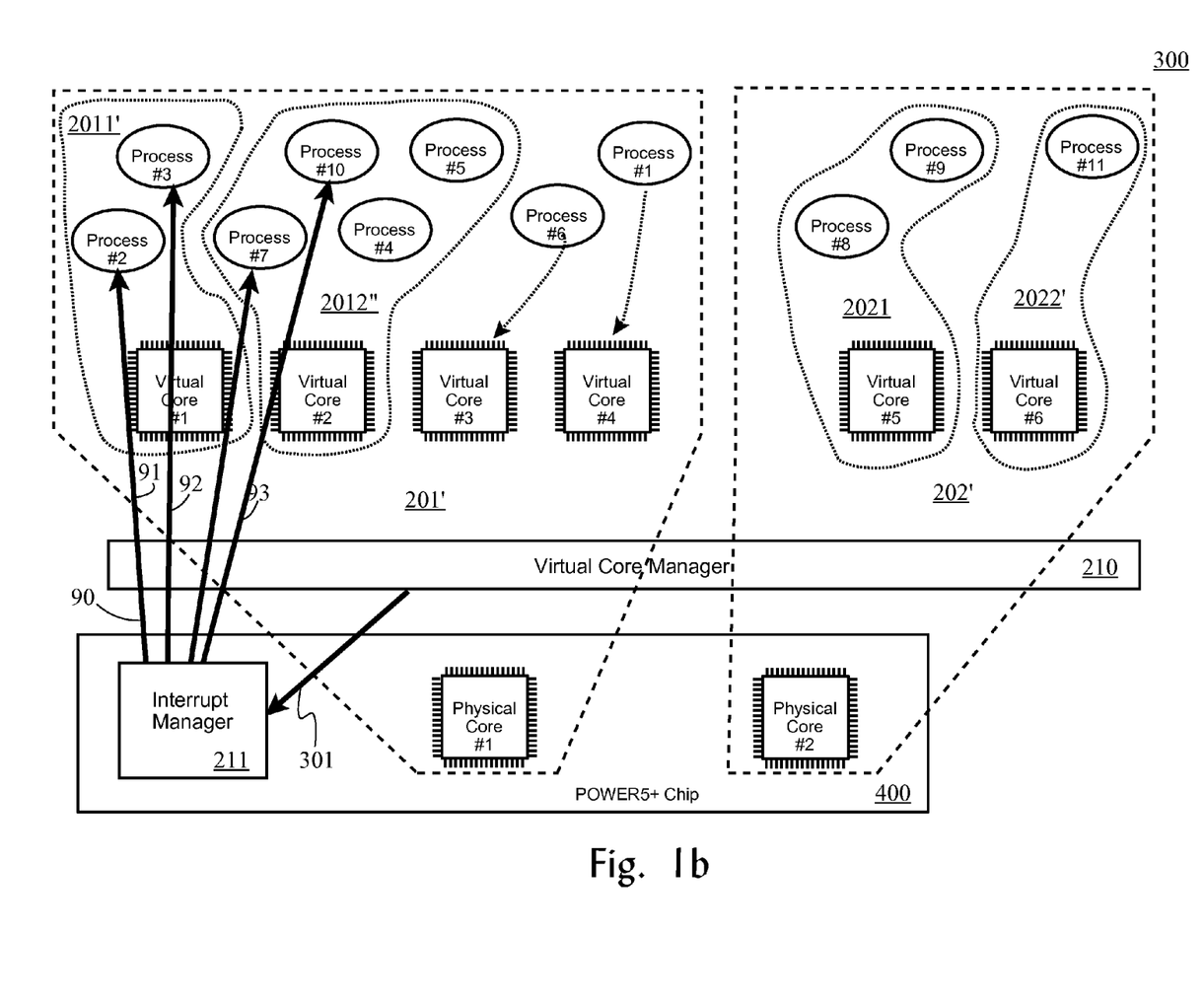

Now, referring to FIG. 1a, according to the methods of the present invention, the virtual core manager (210) determines which of the processes are interrupt-intensive for a given period of time (e.g. last hour, last day, last week, etc.) and selects one or more of the virtual cores (virtual core 1) onto which to sequester those interrupt-intensive processes. In this example, processes 2, 3, 7 and 10 are determined to be presently interrupt-intensive, and virtual core 1 is selected to execute the interrupt-intensive tasks. The virtual core manager then migrates (2011') these processes onto or into virtual core 1, and commands (301) to direct (bias) the interrupts (90, 91, 92, and 93) to virtual core 1. Some tasks or processes may be migrated off the target virtual core and onto the other virtual cores in order to free bandwidth and resources on the targeted core to execute the interrupt-intensive processes. In practice, more than one virtual core may be pooled to receive the migrated interrupt-intensive processes, wherein the pool is less than the totality of available virtual cores (e.g. the pool is a subset of the set of all virtual processors). Please also note that this example show all of the interrupt-intensive processes being migrated to a single virtual processor, but in practice, the interrupt-intensive processes may be migrated to multiple virtual cores (2012") as shown in FIG. 1b.

Figure 3B:
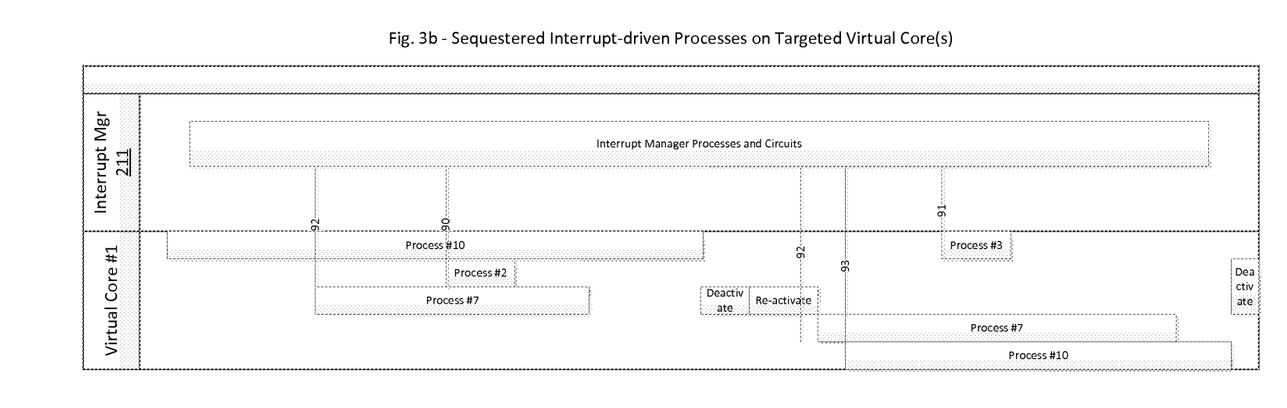
FIG. 3b illustrates an example multi-threaded or multi-tasking timeline of some of the example virtual cores of FIG. 1 according to at least one embodiment of the present invention.

As illustrated in FIG. 3b in which the interrupt events (90, 91, 92, and 93) are located at the same times as shown in FIG. 3a, and in which the handling processes 2, 3, 7, and 10 are also shown as having the same time length as in FIG. 3a, one can see the efficiency of the sequestration of the interrupt-intensive processes into the targeted virtual core(s) (virtual core 1) by the elimination of the de-activation, idle, and re-activation times. This diagram does realistically show that it is possible that, when no interrupt handlers are running, there may still be times of idle and re-activation, but these times are minimized by the fact that it is more likely in this configuration that at least one interrupt handling process will be active at any given time, thus, handling of another interrupt may being almost immediately upon receipt of the interrupt instead of awaiting re-activation of a virtual core.

CONCLUSION

While certain examples and details of a preferred embodiment have been disclosed, it will be recognized by those skilled in the art that variations in implementation such as use of different programming methodologies, microprocessor architectures, and processing technologies, may be adopted without departing from the spirit and scope of the present invention. Therefore, the scope of the invention should be determined by the following claims.

What is claimed is:

1. An automated method of managing interrupt-intensive and interrupt-driven processes among a plurality of virtual processors, wherein each virtual processor is associated with a physical core in a multi-core processor, wherein each physical core may be associated with a plurality of virtual processors, and wherein each virtual processor is tasked to execute one or more processes, the method comprising:

during runtime of a plurality of processes, identifying by a computer which of the plurality of the processes executing among a plurality of virtual processors have been and have not been driven by at least a minimum count of interrupts over a period of elapsed time of the operation of the computer;

selecting by the computer a subset of the plurality of virtual processors to form a sequestration pool containing one or more virtual processors, wherein the selecting is based on one or more criteria selected from the group consisting of a physical processor core's proximity to an interrupt controller, a physical processor core's closeness to an interrupt controller, a physical processor core's closeness to an interrupt handler, a physical processor core's closeness to an interrupt adapter, a physical processor core's proximity to an interrupt adapter, and a virtual processor running an operating system which is more adapt at responding to interrupts;

migrating by the computer the processes which were identified as having been driven by at least the minimum count of interrupts onto the sequestration pool of virtual processors;

commanding by the computer a bias in delivery or routing of the interrupts to the sequestration pool of virtual processor;

relieving at least one virtual processor outside of the sequestration pool to execute the processes which were identified as having been driven by less than the minimum count of interrupts over the period of elapsed time of the operation of the computer; and automatically repeating the identifying, selecting, migrating and commanding, thereby migrating processes which have not been driven by at least a minimum count of interrupts over a period of elapsed time and have ceased to be interrupt-intensive out of the sequestration pool, thereby freeing processing resources in the sequestration pool.

2. The automated method as set forth in claim 1 wherein the relieving further comprises relieving processing resources within the sequestration pool to accommodate execution of processes remaining in the sequestration pool.

3. The automated method as set forth in claim 1 wherein the commanding comprises configuring an interrupt handler.

4. The automated method as set forth in claim 1 wherein the determining further comprises:

establishing a counter starting value for each process which handles an interrupt; incrementing the counter for each handling of an interrupt by each process;

subsequent to the period of elapsed time, comparing each counter to a threshold; and responsive to a count meeting or exceeding the threshold, identifying the corresponding process to be interrupt intensive for migration to the sequestration pool.

5. The automated method as set forth in claim 1 further comprising periodically repeating the identifying, selecting, migrating on and commanding, thereby migrating additional processes which have become interrupt-intensive into the sequestration pool.

6. The automated method as set forth in claim 2 wherein the automatic repeating further comprises periodically repeating the identifying, selecting, migrating and commanding.

7. A computer program product for managing interrupt-intensive and interrupt-driven processes among a plurality of virtual processors, wherein each virtual processor is associated with a physical core in a multi-core processor, wherein each physical core may be associated with a plurality of virtual processors, and wherein each virtual processor is tasked to execute one or more processes, the computer program product comprising:

at least one tangible, computer readable storage non-transitory memory device which is not a propagating signal per se; and computer program instructions encoded by the at least one tangible, computer readable storage memory device and configured to cause a processor to, when executed:

during runtime of a plurality of processes, identify which of the plurality of the processes executing among a plurality of virtual processors have been driven and have not been by at least a minimum count of interrupts over a period of elapsed time of the operation of the computer;

select a subset of the plurality of virtual processors to form a sequestration pool containing one or more virtual processors, wherein the selecting is based on one or more criteria selected from the group consisting of a physical processor core's proximity to an interrupt controller, a physical processor core's closeness to an interrupt controller, a physical processor core's closeness to an interrupt handler, a physical processor core's closeness to an interrupt adapter, a physical processor core's proximity to an interrupt adapter, and a virtual processor running an operating system which is more adapt at responding to interrupts;

migrate the processes which were identified as having been driven by at least the minimum count of interrupts onto the sequestration pool of virtual processors;

command a bias in delivery or routing of the interrupts to the sequestration pool of virtual processors;

relieve at least one virtual processor outside of the sequestration pool to execute the processes which were identified as having been driven by less than the minimum count of interrupts over the period of elapsed time of the operation of the computer; and automatically repeat the identifying, selecting, migrating and commanding, thereby migrating processes which have not been driven by at least a minimum count of interrupts over a period of elapsed time and have ceased to be interrupt-intensive out of the sequestration pool, thereby freeing processing resources in the sequestration pool.

8. The computer program product as set forth in claim 7 wherein relieving further comprises relieving processing resources within the sequestration pool to accommodate execution of processes remaining in the sequestration pool.

9. The computer program product as set forth in claim 7 wherein the commanding comprises configuring an interrupt handler.

10. The computer program product as set forth in claim 7 wherein the determining further comprises:

establishing a counter starting value for each process which handles an interrupt; incrementing the counter for each handling of an interrupt by each process;

subsequent to the period of elapsed time, comparing each counter to a threshold; and responsive to a count meeting or exceeding the threshold, identifying the corresponding process to be interrupt intensive for migration to the sequestration pool.

11. The computer program product as set forth in claim 7 wherein the computer program instructions comprise program instructions to cause periodic repeating of the identifying, selecting, migrating on and commanding, thereby migrating additional processes which have become interrupt-intensive into the sequestration pool.

12. The computer program product as set forth in claim 8 wherein the computer program instructions to automatically repeat the identifying, selecting, migrating and commanding are periodically repeated.

13. A system for managing interrupt-intensive and interrupt-driven processes among a plurality of virtual processors, wherein each virtual processor is associated with a physical core in a multi-core processor, wherein each physical core may be associated with a plurality of virtual processors, and wherein each virtual processor is tasked to execute one or more processes, the system comprising:

one or more physical processors for executing program instructions;

one or more tangible, computer readable storage memory devices which are not propagating signals per se; and program instructions encoded by the one or more memory devices and configured to cause the one or more physical processors to, when executed:

during runtime of a plurality of processes, identify by a computer which of the plurality of the processes executing among a plurality of virtual processors have been driven and have not been by at least a minimum count of interrupts over a period of elapsed time of the operation of the computer;

select a subset of the plurality of virtual processors to form a sequestration pool containing one or more virtual processors, wherein the selecting is based on one or more criteria selected from the group consisting of a physical processor core's proximity to an interrupt controller, a physical processor core's closeness to an interrupt controller, a physical processor core's closeness to an interrupt handler, a physical processor core's closeness to an interrupt adapter, a physical processor core's proximity to an interrupt adapter, and a virtual processor running an operating system which is more adapt at responding to interrupts;

migrate the processes which were identified as having been driven by at least the minimum count of interrupts onto the sequestration pool of virtual processors;

command a bias in delivery or routing of the interrupts to the sequestration pool of virtual processors;

relieve at least one virtual processor outside of the sequestration pool to execute the processes which were identified as having been driven by less than the minimum count of interrupts over the period of elapsed time of the operation of the computer; and automatically repeating the identifying, selecting, migrating and commanding, thereby migrating processes which have not been driven by at least a minimum count of interrupts over a period of elapsed time and have ceased to be interrupt-intensive out of the sequestration pool, thereby freeing processing resources in the sequestration pool.

14. The system as set forth in claim 13 wherein the program instructions for migrating comprise program instructions for the relieving further comprise program instructions for relieving processing resources within the sequestration pool to accommodate execution of processes remaining in the sequestration pool.

15. The system as set forth in claim 13 wherein the program instructions for commanding comprises program instructions for configuring an interrupt handler.

16. The system as set forth in claim 13 wherein the program instructions for determining further comprise program instructions for:

establishing a counter starting value for each process which handles an interrupt; incrementing the counter for each handling of an interrupt by each process;

subsequent to the period of elapsed time, comparing each counter to a threshold; and responsive to a count meeting or exceeding the threshold, identifying the corresponding process to be interrupt intensive for migration to the sequestration pool.

17. The system as set forth in claim 13 wherein the program instructions further comprise program instructions for periodically causing repeating the identifying, selecting, migrating on and commanding, thereby migrating additional processes which have become interrupt-intensive into the sequestration pool.

18. The system method as set forth in claim 14 wherein the program instructions to automatically repeat the identifying, selecting, migrating and commanding are periodically repeated.

* * * * *